Figure 1:
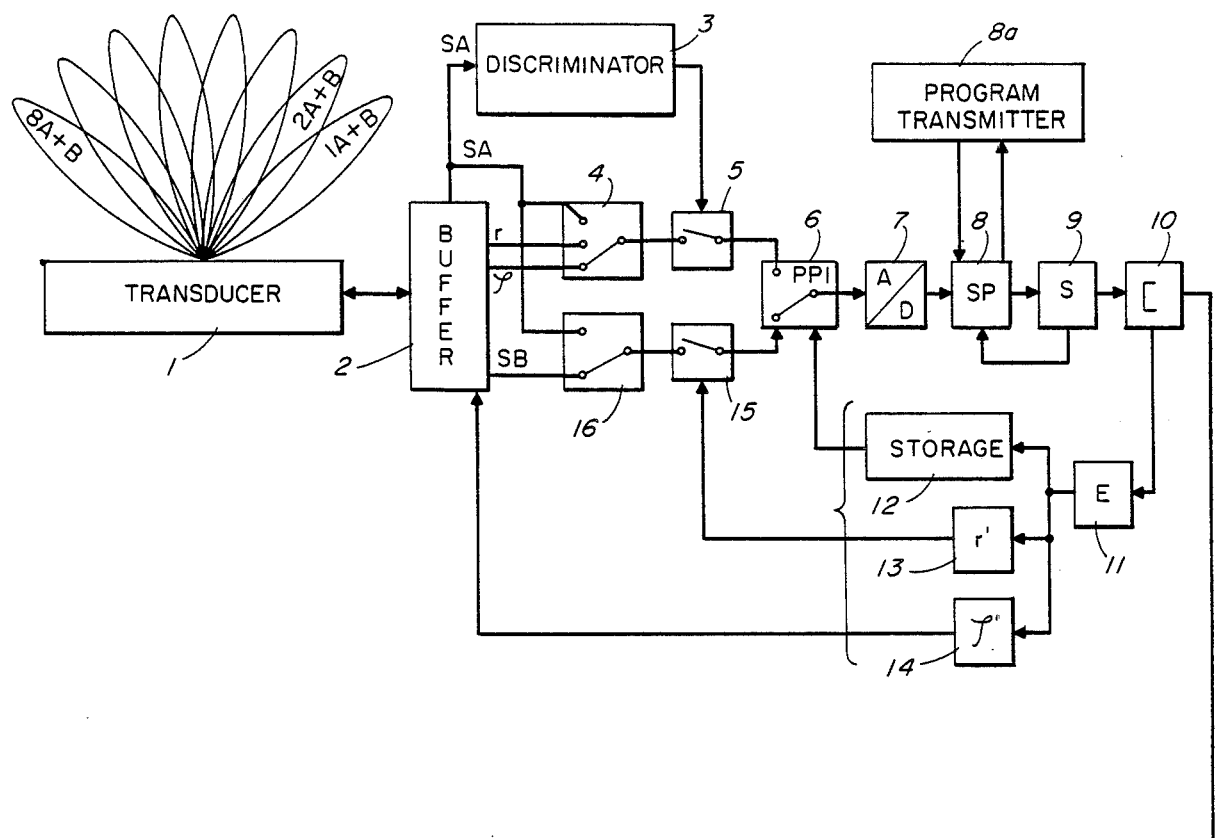
Figure 1:
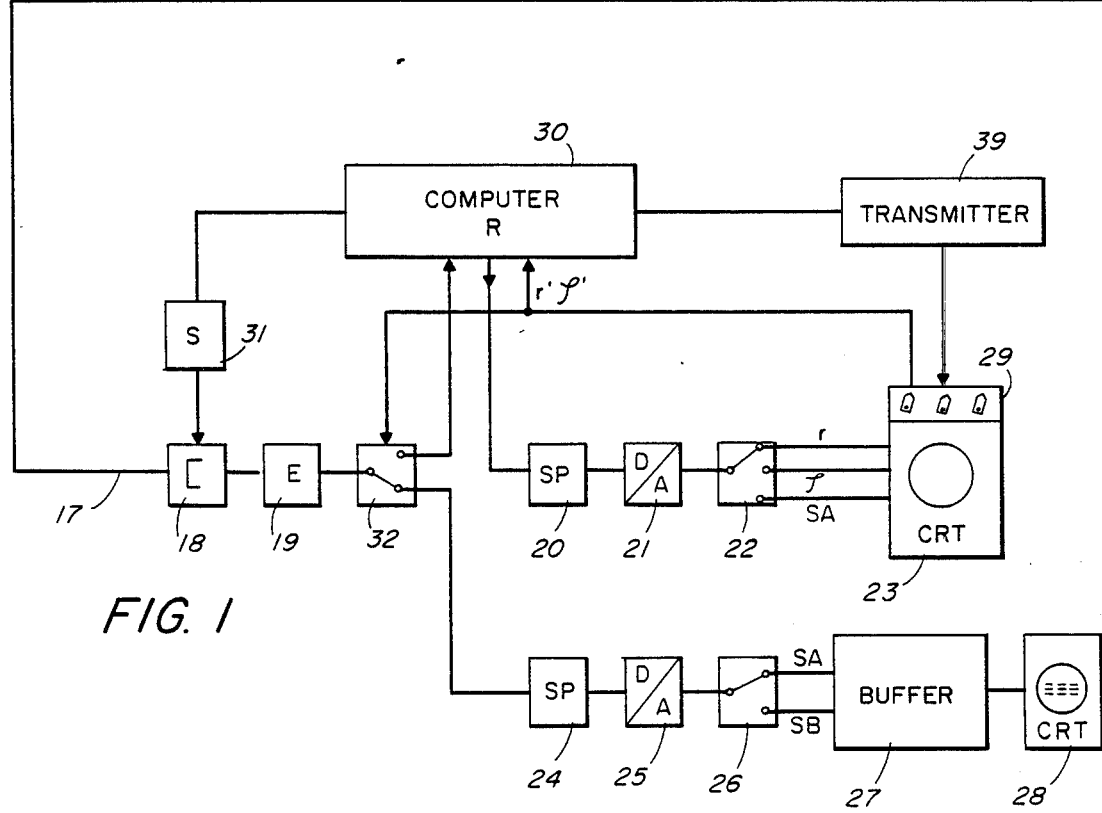

United States Patent [19]

Schwarz et al.

[11] Patent Number: 4,653,032

[45] Date of Patent: Mar. 24, 1987

[54] ARRANGEMENT FOR THE DETERMINATION OF THE DIRECTION AND/OR DISTANCE OF OBJECTS BY MEANS OF WATER-BORNE SOUND WAVES

[76] Inventors: Hans D. Schwarz, Am Querkamp 58, Bremen; Werner Thomsen, Seestr. 25, Plön/Holstein, both of Fed. Rep. of Germany

[21] Appl. No.: 866,434

[22] Filed: Oct. 10, 1969

[51] Int. Cl.⁴ .................... G01S 7/62; G01S 15/06
[52] U.S. Cl. ................................................ 367/113
[58] Field of Search ............ 340/3 R, 5 R, 6 R; 114/20-24; 367/99, 113

[56] References Cited

U.S. PATENT DOCUMENTS 3,148,651 9/1964 Ray ........................................ 114/21
3,419,845 12/1968 Thiede et al. ........................... 340/3

*Primary Examiner*—Richard A. Farley
*Attorney, Agent, or Firm*—Wolf, Greenfield & Sacks

[57] ABSTRACT

The system is for determining the direction and/or distance of objects and, especially of watercrafts, by means of water-borne sound waves transmitted from the ship to a torpedo, for example. The system includes a cathode ray tube located on the ship for displaying sectors of interest, at least one storage means at the torpedo for storage and delivery of sound location data and being connected to a length of wire for transmitting stored location data over the wire to the ship, a controllable threshold discriminator connected to the storage means, and means for limiting the frequency bandwidth of data signals transmitted over the communication wire to an order of magnitude of 500 Hz.

16 Claims, 2 Drawing Figures

ARRANGEMENT FOR THE DETERMINATION OF THE DIRECTION AND/OR DISTANCE OF OBJECTS BY MEANS OF WATER-BORNE SOUND WAVES

The invention relates to an arrangement for the determination of the direction and/or distance of objects, especially of watercrafts, by means of water-borne sound waves within several adjacent sectors of a bearing area of an active or passive sonar equipment forming a means of communication of limited band width between a ship and a dirigible projectile such as a torpedo carrying part of said sonar equipment the indicating device of which contains at least one cathode ray tube for indicating the direction of sound waves and/or the distance of objects.

In known equipments of the kind described above a wire unwinding after launching of the torpedo or the torpedo-like projectile is used as a means of communication by which signals from an electroacoustic device within the head of said projectile which is part of a search-beam-sonar equipment are transmitted to the ship. The distance over which the dirigible torpedo may be controlled from the ship is limited by the total length of the unwinded wire which in turn is limited by the frequency band width of the communication. Said frequency band width is narrowed down with growing length of wire. The torpedo is carrying the electroacoustic transducer of the search-beam-sonar equipment and part of the inherent electronic means. One or more cathode ray tubes are set in the ship for the indication of bearing and/or distance of Objects located within the search-beam.

It is an object of the present invention to minimize the frequency band width as far as possible in order to cover distances as large as possible by using a corresponding great length of wire and nevertheless to transmit all informations necessary for detection, identification and pursuit of objects especially of watercrafts and especially information relating to bearing and/or distance of objects within a large horizontal sector.

The invention consists in an arrangement for the determination of the direction and/or distance of objects, especially of watercrafts, by means of water-borne sound waves within several adjacent sectors of a bearing area of an active or passive sonar equipment forming a means of communication of limited band width between a ship and a dirigible projectile such as a torpedo carrying part of said sonar equipment the indicating device of which contains at least one cathode ray tube for indicating the direction of sound waves and/or the distance of objects, comprising (a) a cathode ray tube at the ship for a display of adjacent sectors in plan position indication (PPI) or partial plan position indication, (b) at least one storage means at the torpedo especially an output storage means for storage and delivery of sound location data as bearing ($\phi$) and/or distance or range (r) of targets which storage means is connected to said communication means for transmitting stored location data through said wire to the ship, (c) a controllable threshold value discriminator connected to said storage means, (d) means limiting the frequency band width of data signals transmitted by said communication means to an order of magnitude of 500 Hz.

Such an arrangement has the advantage that location data from all adjacent sectors may be transmitted within a smallest possible space of time. Another important advantage is an effective protection against acoustic means to deceive because extension and location of propeller wash and moving ship are well distinguishable.

The invention may be better understood by consideration of its background as follows:

Although location information of sonar equipment is consisting of signals of relative small band width it is nevertheless impossible to transmit the complete location information from only a single sector of the search beam sonar equipment on the torpedo through a long wire to the ship, which would be necessary for a display at a plan position indicator on the ship. Now, such a plan position indicator is a preferred means to detect and observe targets by echo sounding. To obtain an image for detection and identification of targets like watercrafts it would be useful to avoid quick changes of said image. Therefore the information volume for production of the image can be small compared with the band width of the original location information of the sonar equipment.

These circumstances make it possible to reduce the band width by said storage means and threshold value discriminator. The threshold value discriminator offers the advantage of an even distributed response function to disturbances; overcome the indication of reverberation zones which is typical at conventional plan position indicators can be avoided by using a threshold value discriminator according to the invention. It is uninteresting to indicate such reverberation zones because the torpedo can scarcely be steered in a manner to avoid such zones without the risk of losing the target. Therefore it is preferred to transmit location information in reverberation zones only if the echoes from targets especially a watercraft will reach a magnitude above the threshold of the threshold value discriminator which threshold is adjusted by the effective magnitude of the reverberation signals.

The output storage may be combined with a programme transmitter for restriction of the reading-in data especially from said signal buffer stage relating to the distance (r) and/or bearing ($\phi$) of received sonar signals.

The storage capacity of the output storage is adapted to the minimum of the expectable volume of information. It may be considered that generally only one, eventually two or three and in any case only few objects are to be observed which, however, may appear in any sector. In order to avoid that said minimum is exceeded by unessential signals it is preferred to increase the threshold of said threshold value discriminator with growing contents of the output storage.

The location information from the output storage may be transmitted to a first transmitter, a branching stage, said communication connection, a second branching stage and a second receiver amplifier to a computer for conversion of the transmitted relative bearing information related to the course of the torpedo in a true bearing information related to north-direction which then is stored in a second storage means which in turn is connected through a digital analogue transducer and a demultiplexer to the first cathode ray tube.

The conversion in true bearing information has the advantage that changes of course do not appear at the plan position indicator. The transmission of the additional data for this conversion is possible without essential increase of band width.

The transmission of location information and additional data as mentioned above from the output storage at the torpedo or torpedo-like dirigible projectile by said first transmitter is performed in regular sequence which is slower than the sequence of possibly obtained location information. This squence of transmission is chosen so that according to order 1000 bit/sec can be transmitted.

This reading-out frequency which is relative slow as compared with the frequency possible with respect to the sequence of obtained location data offers the important advantage to reduce the frequency band width for the signal communication from the torpedo to the ship.

The capacity of the second storage on the ship can be made high enough to storage the true location date from the computer over a longer time interval, i.e., equal to several echo sounding periods.

The storage of the true location information from several succeeding echo sounding periods and the comparison of the youngest location information with the information from foregoing echo sounding periods results in a flickerfree image at the screen of the PPI-cathode ray tube.

Another advantage of the storage across a longer time interval is that the computer can be switched to perform the calculation which area is dependent on the repetition of location information within preselected limits of values of location data.

The computer evaluates the area of expected values of distance and bearing from those location information which exceed the threshold of the threshold value discriminator which in turn is controlled by the programme transmitter.

The calculation of area of expected values overmore is utilized to mark these areas at the screen of the cathode ray tube by symbols or color. Conventional means may be used for this purpose. Within the computer an evaluation of the location information stored by the second storage may be performed according to the rules of long time correlation.

Preferably signals corresponding to the area of expected values from an output of the computer may selectively be switched on a second transmitter and second branch stage through said communication connection, the first branch stage, a second receiver amplifier on three intermediate storages in the torpedo, a first intermediate storage for change-over information from PPI to enlarged target view, a second intermediate storage for an expected distance value ($r'$) and a third intermediate storage for an expected bearing value ($\phi'$).

The introduction of these intermediate storage means in connection with the output storage and the comparison of expected values with incoming location information has the advantage that only those location information are transmitted to the output storage which are lying within the area of expected values. Thereby it is possible to further reduce the frequency band width of communication. Moreover only data of location information will be transmitted to the output storage which in all propability originate from watercrafts, wrecks, big objects, propeller wash or shoals of fish the identification of which especially in a true plan position indication at the screen of the PPI-cathode ray tube can relative easily be performed.

In order to facilitate this identification a second cathode ray tube for a convential enlarged target view may be provided which is connected to said second branch stage intermediate a separate second storage, digital-/analogue transducer, demultiplexer and signal dressing stage. Such an enlarged target view requires only all location information from a timely as well as angularly reduced area stored during foregoing echo sounding periods and therefore can be obtained with said small frequency band width of communication.

The intermediate storage means at the torpedo in which the expected values of distance ($r$) and bearing ($\phi$) are stored can be utilized for selection of the area to be indicated at the second cathode ray tube.

Preferably means for periodical reading-out the location information from said first and second storage means are provided whereby the frequency of reading-out is high compared with the frequency of echo sounding periods.

The storage means at the ship connected to the two cathode ray tubes are arranged so that the information data stored in them are alternately transmitted to the cathode ray tubes with a periodic sequence which is small compared with the echo sounding period. Thereby a stationary pattern of images is obtained also at echo sounding periods of a length of several seconds which are much more adapted for identification and observation of targets as are the images of conventional sonar equipments with PPI or enlarged target indication.

Figure 2:
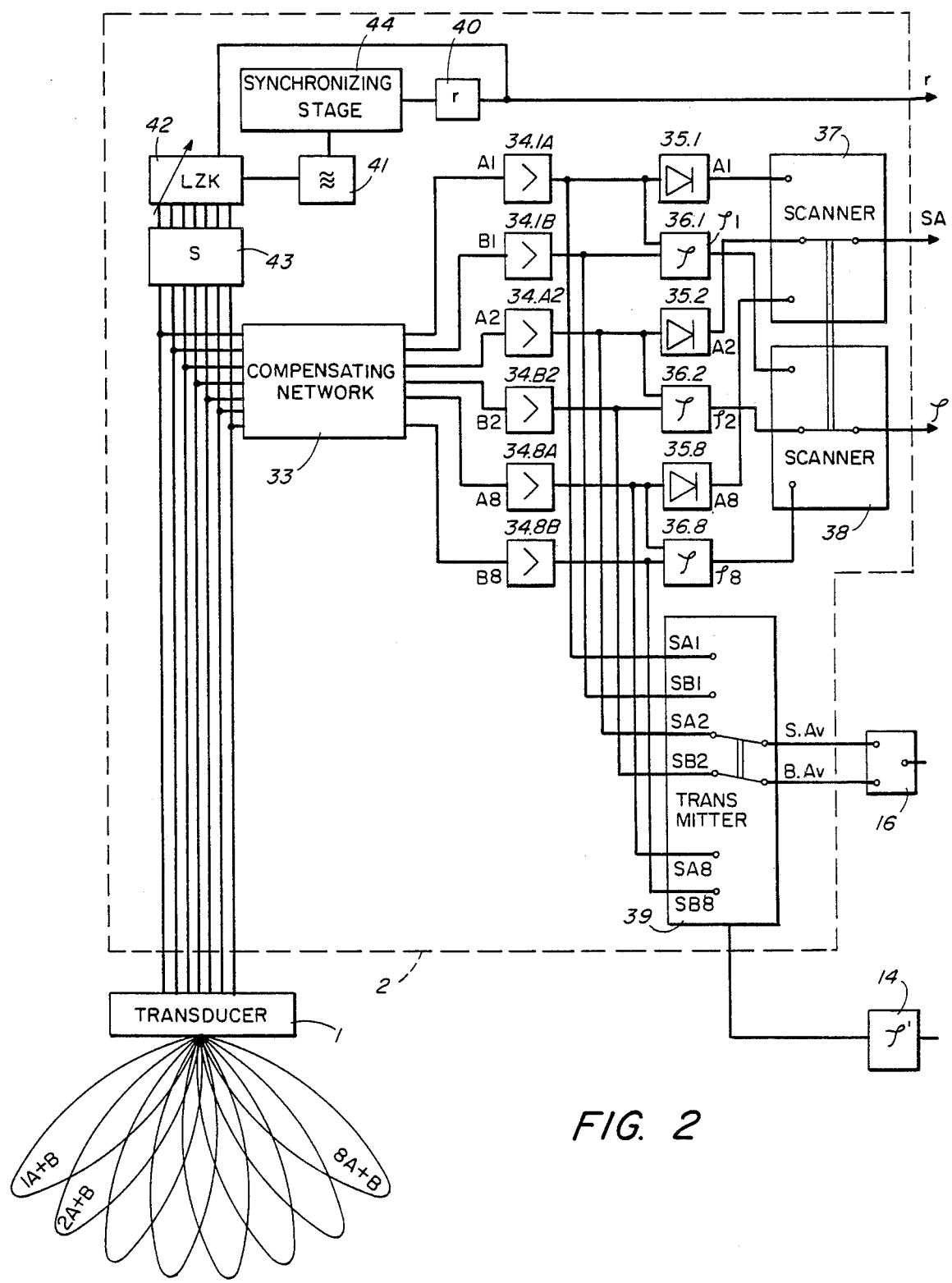

In order to make the invention clearly understood, reference will now be made to the accompanying drawings which are given by way of example and in which:

FIG. 1 is a block diagram of an arrangement according to the present invention and FIG. 2 is a block diagram of that part of the sonar equipment which is arranged at the torpedo or torpedo-like dirigible projectile.

An electroacoustic transducer 1 for water-borne sound consisting of an array of strips is arranged within the head-part of the torpedo or torpedo-like dirigible projectile the observation area of which is directed ahead. The transducer serves for receipt during passive sound location and serves for transmission and receipt during active sound location.

First of all the receipt function of reception which is most important for the present invention shall be illustrated.

The transducer 1 is connected through a signal buffer stage 2 to a controllable threshold value discriminator 3. A compensating network system 33 is connected to the strips of transducer 1 to attain eight angularly separated overlapping receiving directional characteristics or beams $1A+B, 2A+B \ldots 8A+B$ each covering sectors of about 15°. Each beam does exist twice, as A-beam and B-beam whereby the acoustic centres of each corresponding A-beam and B-beam are arranged with a distance of an order of magnitude of half a wave length of the sound wave in water.

The signals $S_A$ and $S_B$ of said A- und B-beams are amplified by amplifiers $34_{1A}$ and $34_{1B}$ to $34_{8A}$ and $34_{8B}$ respectively. These amplifiers include convential AVC/TVC-adjustment. The signals $S_A$ of the A-beams are rectified by rectifiers $35_1$ to $35_8$. Phase difference evaluating networks $36_1$ to $36_8$ are fed by the signals $S_A$ and $S_B$ to produce output signals the values of which are dependent on the phase differences between corresponding A- and B-signals. The signals $S_A$ from the A-beam after rectification in the rectifiers 35.1 to 35.8 are scanned by a conventional scanner 37 and then given at the input of said threshold value discriminator 3.

The signals from the phase evaluating networks $36_1$ to $36_8$ are given to a second scanner 38. The outputs of said two scanners 37,38 are connected to a multiplexer 4. The rectified signals from amplifiers $34_{1A}$ to $34_{8A}$ and the signals from the phase difference evaluating networks $36_1$ to $36_8$ are transmitted by a switch 5 and a change over switch 6 to an analog/digital transducer 7 which in turn is connected to an output storage 8. The output storage 8 is connected to a programme transmitter 8a which is provided for restriction of reading-in of location data per sector. The reading-in of location data especially the reading-in of the distances r which are proportional to the echo transit times and the reading-in of the bearing characterized by the corresponding phase differences takes place sporadically. A first transmitter 9 is connected to the output of the output storage 8 for reading-out the contents of the output storage 8 in a regular sequence.

On the assumption that the echo sounding period be 4 sec, that twenty location data may be stored per sector and that additionally beats of the propeller of a ship which has been located by passive location may be stored with 40 bits per echo sounding period, then the maximum of location data to be transmitted to the ship will amount to 200 per period of echo sounding. With a request of accuracy of range of 1% (10 bit), an accuracy of bearing of $\frac{1}{2}°$ at 120° total angular area (8 bit), an indication of overdue amplitude (amplitude above the prescribed threshold) by four stages (2 bit) each location information will result in a word of at least $10+8+2=20$ bit per echo sounding period. In order to avoid an overflowing of the output storage 8 in this critical case it is necessary to transmit the location data with a maximum of frequency equal to $4000/(2\cdot4)=500$ Hz. The digital values are read-out through a branch stage 10 by frequency shift keying. No high signal-/noise ratio is necessary when transmitting the location data through a wire 17 from the torpedo to the ship by digital values.

Thus it is possible to have a wire of great length with a frequency of transmission of 500 Hz. When using the conventional direct transmission without an output storage $2^{10}\cdot2^8=2\cdot6\cdot10^5$ image points must be transmitted in each echo sounding period. This would require a band width of $(2\cdot6\cdot10^5)/(2\cdot4)=32$ kHz without taking into account the four degrees of brightness.

The restriction of the necessary band width from 32 to 0.5 kHz is an important advantage of the invention regarding the fact that the length of the wire which is used as communication means can be increaed by the same ratio.

The location data transmitted through the wire 17 from the torpedo to the ship after passing a branch stage 18, a receiver amplifier 19 and a second change-over switch 32 the function of which will be described in connection with the function of the aforesaid change-over switch 6, are given to a computer 30.

Also data relating to the run of the torpedo are transmitted simultaneously through the wire 17 and are given to the computer 30. This can be done without great increase of the band width and the means for measuring and transmitting the respective values are not shown in the drawing because they do not belong to the sonar equipment.

The computer 30 translates at first the location data from relative bearing, i.e. bearing related to the course of the torpedo to north-bearing or true bearing, i.e. bearing related to the north-direction. These true location data are stored within a second storage 20 which is connected through a digital/analog transducer 21 and a demultiplexer 22 to a first cathode ray tube 23. The cathode ray tube 23 in a conventional manner is arranged for a display of location data relating to direction $\phi$ and distance r in a plan position indication (PPI) whereby the PPI-synchronisation is coupled with that of the demultiplexer. The information $S_A$ relating to the amplitude of the incoming sound signals controls the brightness of the luminous spot.

The second storage 20 especially is made for reading-in location data from several echo sounding periods.

The reading-out of the second storage 20 is performed in such a manner that approximately twenty images or displays per second are transmitted to the cathode ray tube. Thereby is obtained a flickerfree display of the recent past so that in the case of a moving watercraft located by the sonar equipment the way of the watercraft during the recent past is displayed at the plan position indicator.

Marking signals for signing located watercrafts or other objects may be faded in the image from a symbol-signal transmitter 39 by a control panel 29. The symbol-signal transmitter 39 is connected to the computer 30 and may be controlled by the control panel in such a manner that computer 30 will pick up especially the marked objects and will figure out areas of expected values of distance r and direction $\phi$ corresponding to the marked objects.

Controlled by a command signal from the control panel 29, the computer 30 will transmit values of said areas of expected values through a second transmitter 31, the second branch stage 18 and the wire 17 from the ship back to the torpedo and through the branch stage 10 at the torpedo for an intermediate storage 12 for the change-over information from PPI to a lens-like observation of the marked objects and to two intermediate storages 13 and 14 for corresponding expected center values r' and $\phi'$. Thereby the marked object can be represented in an enlarged view at a second cathode ray tube 28 on the ship r' and $\phi'$ are center values of said areas of expected values. Change-over switch 6 is controlled by the output of intermediate storage 12 for changing over from PPI at cathode ray tube 23 to enlarged target view at cathode ray tube 28.

The signal buffer stage 2 is controlled by the output value $\phi'$ in such a manner that by actuating a double changeover switch in the following called target switch 45 only the signals $S_A'$ and $S_B'$ corresponding to said center value $\phi'$ are selected and transmitted through a multiplexer 16 and a range switch 15 to the analog/digital transducer 7. The range switch 15 is controlled by the center value r' at the output of the intermediate storage 13 in such a manner that the digitized signals $S_A'$ and $S_B'$ are passed to the output storge 8 only within the range $r'\pm100$ meters.

Depending on the position of intermediate storage 12 and change-over switch 6 controlled by the computer 30 the output storage 8 is fed by the information data for PPI from the total angular area of eight sectors or by the information data from a little area of range and bearing including a selected interesting target.

The reading-out of the output storage 8 takes place independent on the stored data in a slow and steady sequence. The change-over switch 32 on the ship is operated simultaneously with the change-over switch 6 on the torpedo so that the PPI-signals will be transmitted to the second storage 20 whereas the signals for said enlarged view are transmitted to a further storage 24. If the signals $S_A'$ and $S_B'$ are scanned by the multiplexer 16 with a frequency $f_{16}$ at equidistant times then the original signals may be regenerated by corresponding rapid reading-out of the storage 24 through a digital/analog transducer 25, a demultiplexer 26 and a filtering within a second signal dressing stage 27.

If the non-destructive reading-out from the storage 24 and the demultiplexing by demultiplexer 26 is operated with a frequency which is higher by a factor n compared with the frequency of multiplexer 16, then the signals $S_A'$ and $S_B'$ with n-times greater band width could be indicated n times per echo sounding period at the cathode ray tube 28. By a sufficient high n a flicker-free image is produced at the cathode ray tube 28, which may change once per echo sounding period. If informations from several (m) echo sounding periods are stored within the storage 24 then it is necessary to increase the frequency of reading out from n to m·n in order to display the complete contents of the storage 24 n-times at the cathode ray tube 28.

In a similar manner the PPI-information is displayed in a flickerfree manner at the cathode ray tube 23 with the second storage 20, digital/analog transducer 21 and demultiplexer 26, whereby the frequency of reading-out of the second storage is n·m higher than the scanning frequency of multiplexer 4.

Within the second signal dressing stage 27 preferably a frequency multiplication may be applicated by using in a conventional manner an evaluation of doppler frequency with high persistance within a fraction of time needed with original frequency.

The range or distance r is determined in a conventional manner after beginning of an echo sounding period by a trigger input from a synchronizing stage 44 by a time measuring stage 40. An oszillator 41 is simultaneously controlled by said synchronizing stage 44 which is connected through a delay-line network 42 to a transmitter 43 with eight stages connected to said eight strips of transducer 1.

The invention is applicable not only at torpedoes or torpedo-like dirigible projectiles which are connected to the ship by a wire but it may be used as well in connection with a communication by radio. Thus, a torpedo-like projectile could cover a first part of its way as a rocket and submerge only after approach to the target whereby location information is transmitted by a relative short drag antenna.

The invention is useful also for civil purposes to solve the problem of location of shoals of fish and especially shoals of fish above ground, by using a sonar equipment part of which is arranged on the sumberged fishing net. The small band width which can be used by the present invention is useful also in such fishing equipments especially if the transmission of location data shall be made through the water instead of a cable. In this case the problem is less to reach a communication over a large distance rather than to obtain an elimination of interference inspite of high noise level.

We claim:

1. Arrangement for the determination of the direction and/or distance of objects, especially of watercrafts, by means of water-borne sound waves within several adjacent sectors of a bearing area of an active or passive sonar equipment including a wire forming a means of communication of limited band width between a ship and a dirigible projectile such as a torpedo carrying part of said sonar equipment, the indicating device of which contains at least one cathode ray tube for indicating the direction of sound waves and/or the distance of objects, the improvement comprising,
   (a) a cathode ray tube at the ship for a display of adjacent sectors in at least partial plan position indication,
   (b) at least one storage means at the torpedo especially an output storage for storage and delivery of sound location data as bearing and/or distance or range of targets which storage means is connected to said communication means for transmitting stored location data through said wire to the ship,
   (c) a controllable threshold value discriminator connected to said storage means,
   (d) means coupled from said discriminator for limiting the frequency band width of data signals transmitted by said communication means to an order of magnitude of 500 Hz.

2. Arrangement as claimed in claim 1, characterized by that the output storage is combined with a programme transmitter for restriction of the reading-in data especially from a signal dressing stage relating to the distance and/or bearing of received sonar signals.

3. Arrangement as claimed in claim 1, characterized by that the storage capacity of the output storage is adapted to the minimum of the expectable volume of information.

4. Arrangement as claimed in claim 1, characterized by that the threshold of said threshold value discriminator is increasing with growing contents of the output storage.

5. Arrangement as claimed in claim 1, characterized by that the location information from the output storage are transmitted through a transmitter, a first branching stage and a communication means and through a second branching stage and receiver amplifier to a computer for conversion of the relative bearing information related to the course of the torpedo in a true bearing information related to north-direction which is stored in a second storage means which in turn is connected through a digital/analog transducer and a demultiplexer to the first cathode ray tube.

6. Arrangement as claimed in claim 5, characterized by that the location information from said transmitter are transmitted in a regular sequence which is slower than the sequence of possibly incoming location information per second so that an order of 1000 bit may be transmitted.

7. Arrangement as claimed in claim 5, characterized by that the capacity of the second storage is high enough to storage the true location data from the computer over a longer time interval, equal to several echo sounding periods.

8. Arrangement as claimed in claim 5, characterized by that the computer is switchable to computing of areas of expected location data within several echo sounding periods.

9. Arrangement as claimed in claim 1, characterized by that only signals above the threshold of said threshold value discriminator will control the computer for computing corresponding areas of expected values of location data.

10. Arrangement as claimed in claim 1, characterized by that the areas of expected values are indicated at the cathode ray tube by symbols or by color.

11. Arrangement as claimed in claim 5, characterized by that the true location information at the output of said computer are stored in the second storage from several echo sounding periods and are evaluated by the computer by correlation over long times periods.

12. Arrangement as claimed in claim 8, characterized by that signals corresponding to the areas of expected values from an output of said computer may selectively be switched on a second transmitter and second branch stage through said communication connection the first branch stage a second receiver amplifier on three intermediate storages, a first intermediate storage for change-over information from PPI to enlarged target view, a second intermediate storage for an expected distance value and a third intermediate storage for an expected bearing value.

13. Arrangement as claimed in claim 1, characterized by that a second cathode ray tube is arranged on the ship for indication of said enlarged target view.

14. Arrangement as claimed in claim 13, characterized by that said second branch stage is connected to second cathode ray tube through a separate storage, digital/analog transducer, demultiplexer and signal buffer stage.

15. Arrangement as claimed in claim 14, characterized by that automatic change-over switches are provided for alternating operation of said first and second cathode ray tubes.

16. Arrangement as claimed in claim 15, characterized by that means for periodical reading-out the location information from said first and second storages are provided with a frequency of reading-out which is high compared with the frequency of echo sounding periods.

* * * * *